(12) United States Patent
Noh et al.

(10) Patent No.: US 8,695,230 B2
(45) Date of Patent: Apr. 15, 2014

(54) CONTROL METHOD OF DRYER

(75) Inventors: Hyun Woo Noh, Changwon-si (KR); Yong Ju Lee, Changwon-si (KR); Sang Ik Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 13/096,444

(22) Filed: Apr. 28, 2011

(65) Prior Publication Data

US 2011/0289794 A1 Dec. 1, 2011

(30) Foreign Application Priority Data

Apr. 28, 2010 (KR) .................. 10-2010-0039367
Apr. 28, 2010 (KR) .................. 10-2010-0039373
May 4, 2010 (KR) .................. 10-2010-0041999

(51) Int. Cl.
*F26B 3/02* (2006.01)

(52) U.S. Cl.
USPC ............... 34/402; 34/425; 34/499; 34/515; 34/595; 34/606; 62/186; 62/298; 68/5 C; 68/18 R (58) Field of Classification Search
USPC ........... 34/376, 381, 402, 418, 425, 452, 487, 34/493, 497, 499, 515, 595, 601, 606; 62/20, 125, 186, 298, 450, 434; 68/5 C, 68/18 R
See application file for complete search history.

(56) References Cited

U.S. PATENT DOCUMENTS

| | | | | |
|---|---|---|---|---|
| 5,829,264 A * | 11/1998 | Ishigaki et al. | ............... | 62/228.3 |
| 6,265,786 B1 * | 7/2001 | Bosley et al. | .................. | 290/52 |
| 6,668,569 B1 * | 12/2003 | Jin | .................. | 62/197 |
| 7,194,823 B2 * | 3/2007 | Nakamoto et al. | ............... | 34/526 |
| 7,690,211 B2 * | 4/2010 | Sakurai et al. | .................. | 62/197 |
| 8,113,009 B2 * | 2/2012 | Kuriyama et al. | ............ | 62/259.2 |
| 8,387,273 B2 * | 3/2013 | Driussi | ............... | 34/524 |
| 2005/0120577 A1 * | 6/2005 | Nakamoto et al. | ............... | 34/74 |
| 2005/0241324 A1 * | 11/2005 | Cho et al. | .................. | 62/150 |
| 2005/0246920 A1 * | 11/2005 | Yabuuchi et al. | ............... | 34/515 |
| 2007/0107451 A1 * | 5/2007 | Sakurai et al. | ............... | 62/228.3 |
| 2007/0130968 A1 * | 6/2007 | Kaga et al. | .................. | 62/157 |
| 2007/0289319 A1 * | 12/2007 | Kim et al. | .................. | 62/175 |
| 2008/0236184 A1 * | 10/2008 | Morozumi et al. | ............ | 62/324.6 |
| 2009/0235677 A1 * | 9/2009 | Yanagida et al. | ............... | 62/115 |
| 2010/0050703 A1 * | 3/2010 | Maekawa et al. | ............ | 68/23 R |
| 2010/0242549 A1 * | 9/2010 | Hosoito et al. | .................. | 68/139 |
| 2011/0289794 A1 * | 12/2011 | Noh et al. | .................. | 34/443 |

FOREIGN PATENT DOCUMENTS

| JP | 2006-116066 A | 5/2006 |
|---|---|---|
| JP | 2007-175528 A | 7/2007 |
| JP | 2008-142101 A | 6/2008 |

(Continued)

OTHER PUBLICATIONS

Dominick Hunter CRV Variable Operation Refrigeration Dryers; Dec. 2005.*
Inverter Compressors: Improving the Efficiency of Refrigerators & Freezers, by John Balazs, Mike Marcario, Jennifer Archibold downloaded from internet on Jun. 18, 2013.*

(Continued)

*Primary Examiner* — Steve M Gravini
(74) *Attorney, Agent, or Firm* — KED & Associates, LLP (57) ABSTRACT

A control method of a dryer is disclosed. A control method of a dryer including a heat pump having a inverter compressor includes determining a driving condition of the dryer; and adjusting at least one of an electric power supplied to the inverter compressor and a driving velocity of the compressor based on the driving condition.

12 Claims, 10 Drawing Sheets

(56) References Cited

FOREIGN PATENT DOCUMENTS

| | | | |
|---|---|---|---|
| JP | 2008-229151 A | | 10/2008 |
| JP | 2009-273686 A | | 11/2009 |
| JP | 2009273488 A | * | 11/2009 |
| JP | 2009-291233 A | | 12/2009 |
| KR | 10-2005-0118439 A | | 12/2005 |
| KR | 10-2007-0076853 A | | 7/2007 |
| KR | 10-2008-0009481 A | | 1/2008 |
| KR | 10-0826204 B1 | | 4/2008 |
| KR | 10-0869425 B1 | | 11/2008 |
| KR | 10-2009-0016916 A | | 2/2009 |
| KR | 10-2009-0028027 A | | 3/2009 |
| KR | 10-2009-0075028 A | | 7/2009 |
| KR | 10-2011-0059993 A | | 6/2011 |
| KR | 10-977925 B1 | | 8/2012 |

OTHER PUBLICATIONS

Panasonic Laundry Tumble Dryer with Inverter Heat Pump Technology website information dated Dec. 2012.*
Korean Notice of Allowance dated Dec. 6, 2011 issued in Application No. 10-2010-0039368.
Korean Notice of Allowance dated Dec. 6, 2011 issued in Application No. 10-2010-0039372.
International Search Report dated Jan. 19, 2012 issued in Application No. PCT/KR2011/003174.
Korean Notice of Allowance dated Aug. 27, 2012 issued in Application No. 10-2010-0042777.
Russian Decision to Grant a Patent dated Sep. 27, 2013 issued in Application No. 2012150848 (with English translation).

* cited by examiner

CONTROL METHOD OF DRYER

CROSS REFERENCE TO RELATED APPLICATION

This application claims the benefit of the Patent Korean Application No. 10-2010-0039367, filed on Apr. 28, 2010, 10-2010-0039373 filed on Apr. 28, 2010 and 10-2010-0041999 filed on May 4, 2010, which are hereby incorporated by reference as if fully set forth herein.

BACKGROUND OF THE DISCLOSURE

1. Field of the Disclosure

The present invention relates to a control method of a dryer.

2. Discussion of the Related Art

Laundry devices may be categorized into washing machines, dryers which can perform drying and washing machines having a drying function which can perform washing and drying. Dryers are electric appliances which supply heated dry air to drying objects to dry them. A variety of dryers have been developed and the dryers accompany a variety of problems.

SUMMARY OF THE DISCLOSURE

Accordingly, the present invention is directed to a control method of a dryer.

An object of the present invention is to provide a control method of a dryer which improves a structure of a compressor provided in a heat pump generating heated air, to make it possible to supply the heated air quickly in an initial driving period.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a dryer including a heat pump having an inverter compressor, the control method includes determining a driving condition of the dryer; and adjusting at least one of an electric power supplied to the inverter compressor and a driving velocity of the compressor based on the driving condition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a dryer according to an exemplary embodiment of the present invention will be described in detail in reference to the accompanying drawings.

Figure 1:
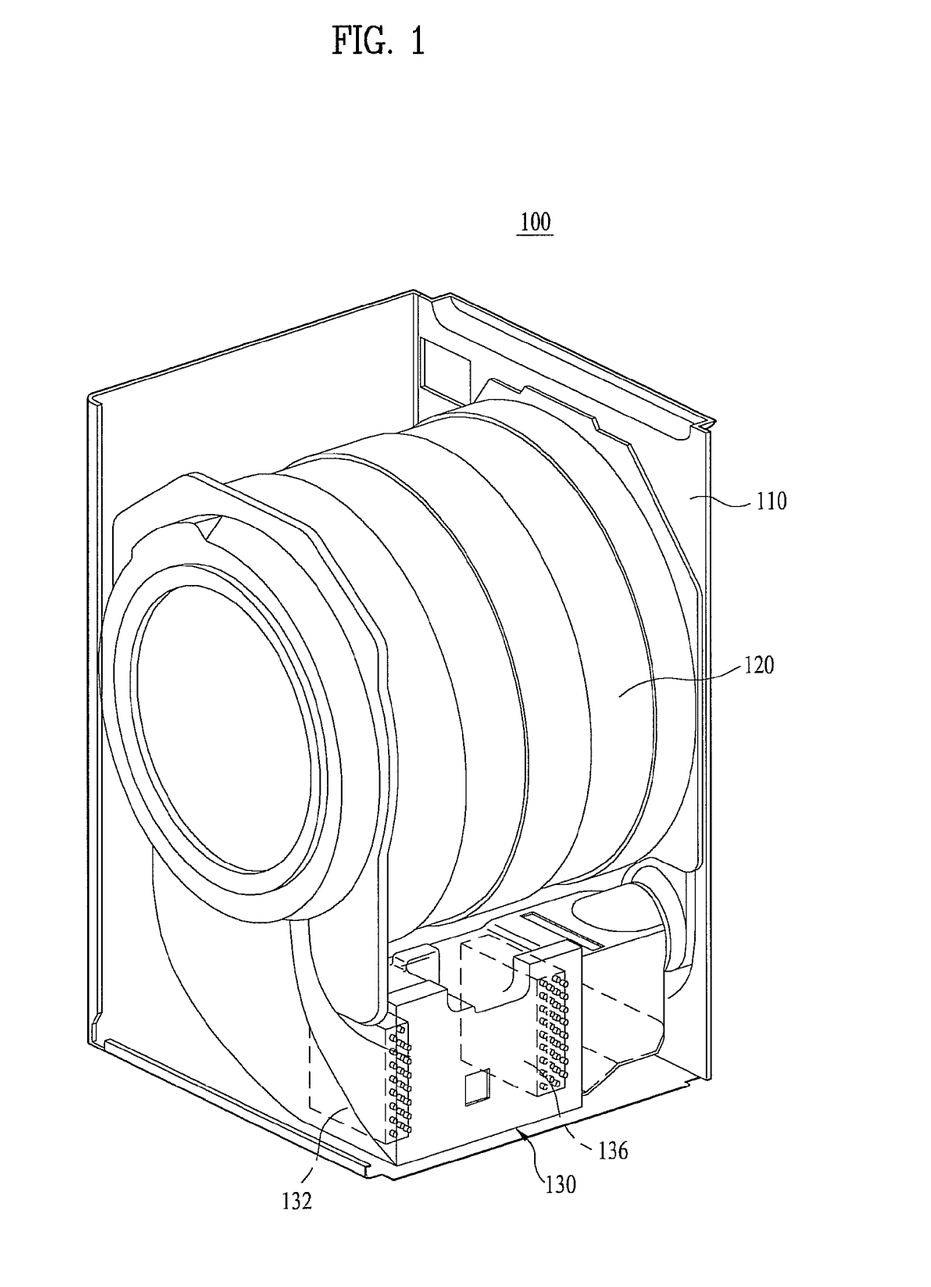
FIG. 1 is a perspective view illustrating an inner configuration of a dryer according to an exemplary embodiment of the present invention.

FIG. 1 is a perspective view illustrating a dryer according to an exemplary embodiment of the present invention.

In reference to FIG. 1, the dryer 100 according to the embodiment of the present invention includes a cabinet 110 forming an exterior appearance thereof. The dryer 100 further includes a drum 120 which is selectively rotatable within the cabinet 110. Drying objects may be loaded into the drum 120. Although not shown in the drawings, the dryer 100 may include a user operational part (not shown) to receive at least one piece of drying information input by a user. The user may use the user operational part to select pieces of the drying information, for example, a wished course. The dryer 100 includes a control unit (not shown) generating an operation signal based on the drying information input via the user operational part.

In the meanwhile, the dryer 100 according to the embodiment may include heating means for supplying dried-air to the drum 120 to dry the drying objects loaded into the drum 120. The dryer 100 according to this embodiment may include a heat pump 130 as the heating means. The heat pump 130 includes an evaporator 132, a compressor (134, see FIG. 3), a condenser 136 and an expansion valve (138, see FIG. 3) where refrigerant is circulated sequentially. The heat pump 130 may dehumidify and dry external air drawn therein and it may heat the dried air to a predetermined temperature. Here, the heat pump 130 is driven based on the operation signal of the control unit.

As follows, the heat pump 130 will be described in detail.

Figure 2:
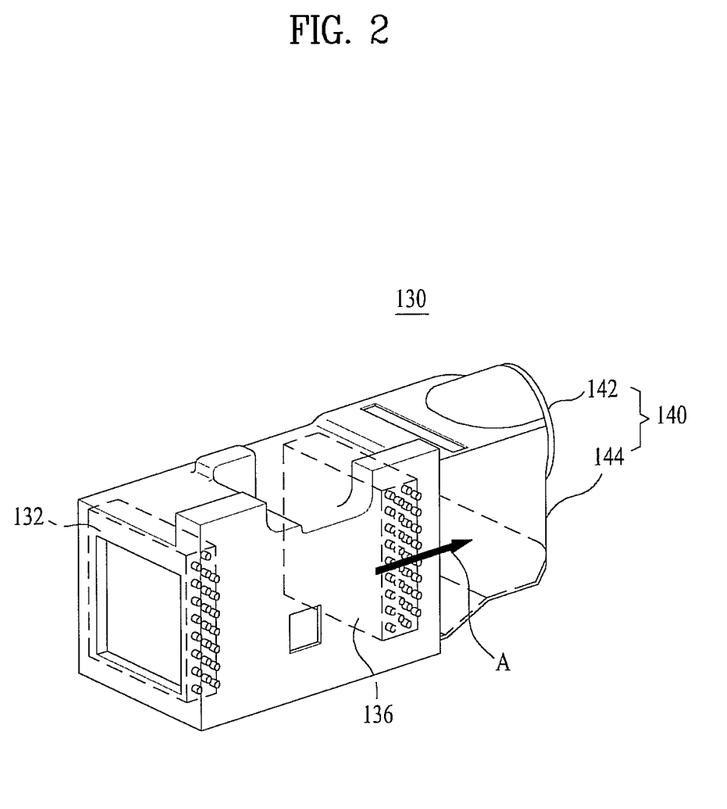
FIG. 2 is a perspective view only illustrating a heat pump from FIG. 1.

FIG. 2 is a perspective view illustrating the configuration of the heat pump 130 according to an embodiment.

In reference to FIG. 2, the heat pump 130 includes an evaporator 132 and an condenser 136. The evaporator 132 condenses refrigerant, to receive a latent heat from the external air drawn therein and it condenses the moisture of the air, to transmit the latent heat to the condenser 136. The condenser 136 heats the air by using the latent heat transmitted from the evaporator 132 via the refrigerant. In other words, the heat pump 130 according to this embodiment controls the evaporator 132 to dehumidify air and the condenser 136 to heat the air to the predetermined temperature, such that it may supply dried/heated air to the drum 120.

In the meanwhile, each component of the heat pump 130 mentioned above may be installed in a predetermined portion of the cabinet 110 provided in the dryer 100 according to the exemplary embodiment. It is preferable that the heat pump 130 may be a module type mounted in a predetermined portion of the cabinet 110 detachably. The module type heat pump 130 is provided and it is then more efficient to assemble and disassemble the dryer according to this embodiment for maintenance. For that, the heat pump 130 according to this embodiment may include a case 140 for forming a profile of the heat pump 130 and the variety of the components mentioned above may be provided in the case 140.

The case 140 may include an upper case 142 and a lower case 144. The various components of the heat pump 130 may be installed in the lower case 144. The upper case 142 may be detachably coupled to the lower case 144. Because of that, the installation and repair of the components installed in the case 140 may be performed smooth and efficient.

The moisture of the air drawn into the case 140 is condensed and the air is dried by the evaporator 132. In other words, the refrigerant is evaporated in a refrigerant pipe of the evaporator 132 and the heat of the air passing outside the evaporator 132 is transmitted to the refrigerant, to cool the air. The moisture is condensed into condensate and the air is relieved of the moisture, to be the dried air.

It is preferable that a condensate storage (not shown) may be further provided to collect the condensate condensed by the evaporator 132. For example, a collecting tank (not shown) is provided below the evaporator 132 to collect the condensate and the collecting tank (not shown) may be connected with the condensate storage located adjacent to the evaporator 132. Because of that, the condensate condensed by the evaporator 132 may be collected in the collecting tank first and it may be stored in the condensate storage via a pipe after that. The condensate storage may be installed in the cabinet 110 to send the collected condensate outside the cabinet 120 via a drainage pipe or it may be detachably installed in the cabinet 110 to allow the user to throw the condensate outside after detaching.

In the meanwhile, the evaporator 132 may store the latent heat in the refrigerant. At the same time, it may condense the moisture of the air and dry the air. In other words, as the moisture contained in the air is condensed, the refrigerant inside the evaporator 132 is getting gaseous to contain the latent heat. The latent heat contained in such the refrigerant is transmitted to the condenser 136 and it is used to heat the air, which will be described later.

In other words, the condenser 136 according to this embodiment is connected with the evaporator 132 and the compressor 134 via a refrigerant pipe (not shown). Because of that, the refrigerant including the latent heat inside the evaporator 132 is supplied to the compressor 134 and the condenser 136 sequentially via the refrigerant pipe. The refrigerant is condensed in the condenser 136 and the latent heat is discharged, such that the air passing the condenser 136 may be heated to a predetermined temperature. As a result, the evaporator 132 condenses the moisture contained in the air and it dries the air. Simultaneously, the evaporator 132 transmits the latent heat generated by the condensation of the moisture to the condenser 136 via the refrigerant. The condenser 136 condenses the refrigerant to discharge the latent heat and it then heats the air.

In the meanwhile, according to this embodiment, a single air path (A) may be formed to guide the air along the evaporator 132 and the condenser 136. In other words, the moisture of the air drawn into the heat pump 130 is condensed and the air is dried. After that, the dried air passes the compressor 134 and it is then heated in the condenser 136, such that the heated air may be supplied to the drum 120. When the single air path (A) is formed, the air supplied to the drum 120 is heated and dried to result in improving a drying effect. Typically, the high temperature as well as the dried air should be supplied to improve the drying effect.

The shape of the air path (A) where the air is flowing is not limited to a specific one. Considering that the heat pump 130 is installed in the cabinet 110, the air path (A) may be formed in a linear shape. For that, the evaporator 132 and the condenser 136 provided in the heat pump 130 may be arranged linearly along the air path (A). Because of that, the volume of the heat pump 130 can be reduced as much as possible and the assembly/disassembly process of the heat pump 130 may be smooth and efficient. Here, a fan (not shown) may be further provided in the case 132 to blow the air to flow along the air path (A) smoothly.

As mentioned above, this embodiment presents the air path provided when the case 140 is provided in the heat pump 130. However, in case the components of the heat pump 130 are installed in a predetermined portion of the cabinet 110, without the case 140, an auxiliary duct may be provided to draw external air to the evaporator 132 and the condenser 136. In the meanwhile, if the air dried and heated by the heat pump 130 is supplied to the drum 120, the air is heated by the condenser 136. Because of that, the temperature of the air supplied by the heat pump 130 of the dryer 100 according to this embodiment may be lower than the temperature of the air supplied by a heater provided in a conventional dryer. Because of that, the dryer according to this embodiment may further include a heater (139, see FIG. 4) to heat the air before drawing the air into the case 140 or the drum 120.

In addition, this embodiment presents that the single air path (A) is formed along the evaporator 132 and the condenser 136 of the heat pump 130. Alternatively, independent air paths may be formed along the evaporator and the condenser. In other words, the moisture of the air drawn into the evaporator 132 is condensed to store the latent heat and the air is discharged outside the heat pump 130 again. The latent heat is transmitted to the condenser 136 via the latent heat and the air drawn into the condenser 136 along the auxiliary air path may be heated to be supplied to the drum 120.

In the meanwhile, dryers may be categorized into circulation type dryers and exhaustion type dryers. In a circulation type uses air circulated in the drum and such an exhaustion type uses air exhausted from the drum. As follows, a circulation type dryer including the heat pump and an exhaustion type dryer including the heat pump will be described.

Figure 3:
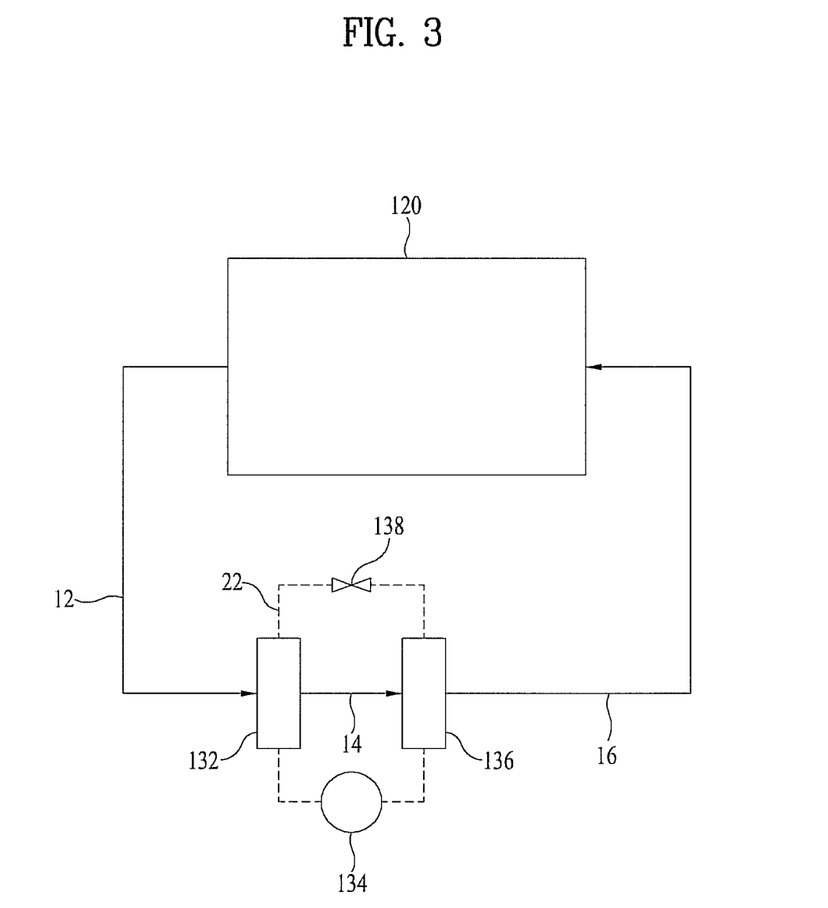
FIGS. 3 to 6 are diagram schematically illustrating a configuration of a dryer including a heat pump according to embodiments.

FIG. 3 is a diagram schematically illustrating a configuration of the circulation type dryer including the heat pump.

In reference to FIG. 3, air exhausted from the drum 120 is supplied to the evaporator 132 along a first air path 12. The moisture of the air is condensed by the evaporator 132 and the air flows to the condenser 136 along a second air path 14 to be heated to a predetermined temperature by the condenser 136. The air having passed the condenser 136 is re-supplied to the inside of the drum 120 along a third air path 16. Here, the evaporator 132 and the condenser 136 may be connected with the compressor 134 and the expansion valve 138 via a refrigerant line 22. The configuration and operation of the heat pump is explained above and repeated description will be omitted.

Figure 4:
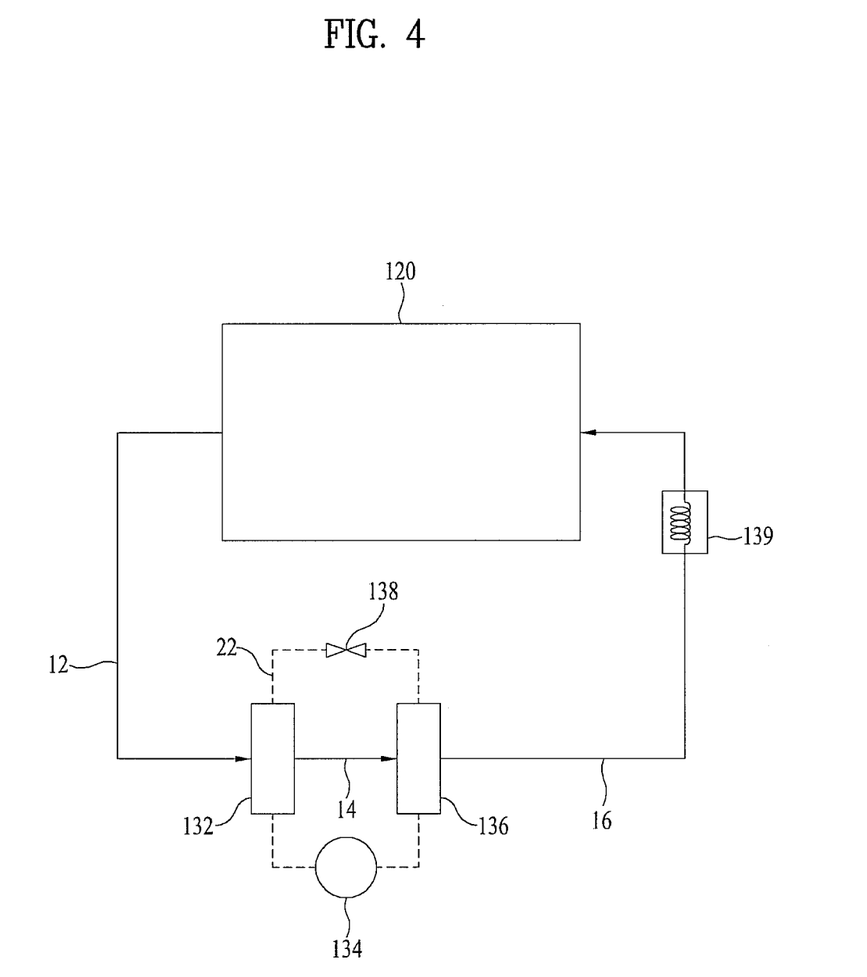

FIG. 4 is a diagram illustrating a circulation type dryer according to another embodiment. According to this embodiment, the air having passed the heat pump is re-heated by a heater 139 before supplied to the drum and this is a different feature, compared with the embodiment of FIG. 3. As follows, this embodiment will be described, focused to the different feature.

In reference to FIG. 4, the air discharged from the condenser 136 is circulated along a third air path 16 to be supplied to inside of the drum 120 via the heater 139. The heater 139 re-heats the air flowing along the third air path 16. Here, the term of "re-heating" means that the air is heated by the heater 139 secondarily after heated by the condenser 136 firstly.

Such the heater 139 may be a gas heater or an electric heater, not limited thereto. When the heater is provided, the air dried and heated by the condenser 136 of the heat pump is re-heated by the heater and it is possible to supply the air having a desired temperature to the drum 120. The air is pre-heated by the condenser 136 and heated by the heater. Because of that, load applied to the heater may be reduced noticeably. In other words, the heater uses less electric energy to heat the air to the desired temperature, compared with the heater provided in the conventional dryer, and it is possible to heat the air to the desired temperature by using a compact-sized heater.

Figure 5:
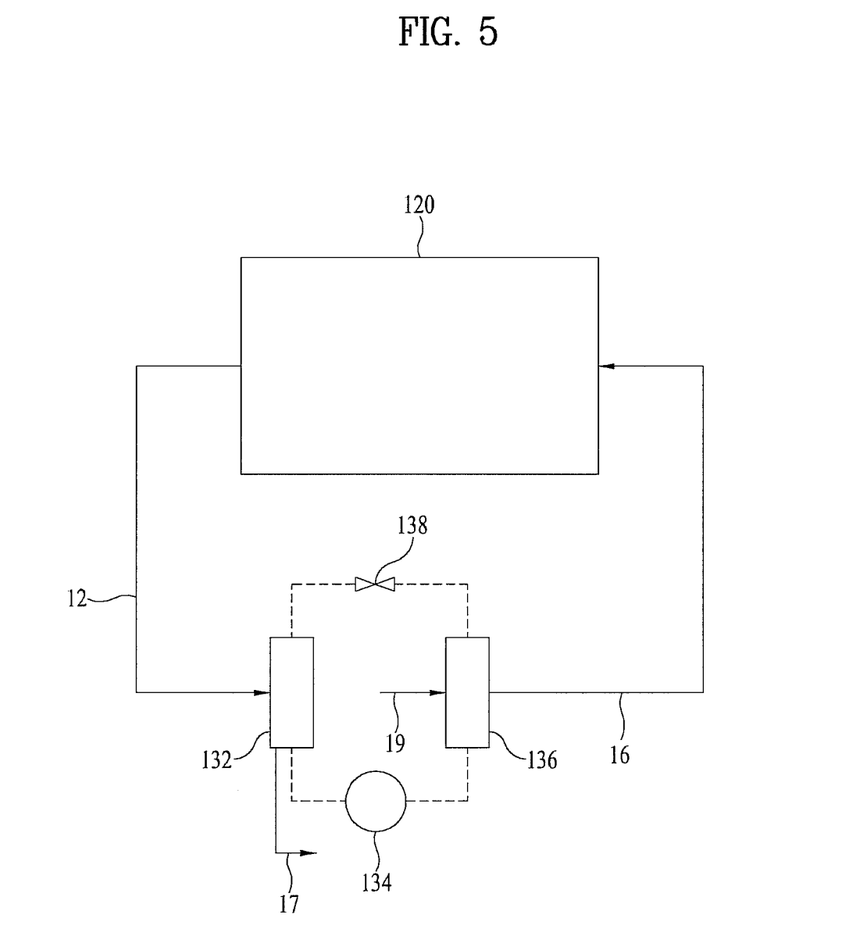

FIG. 5 is a diagram schematically illustrating a configuration of an exhaustion type dryer including the heat pump. Compared with the embodiment of FIG. 3, this embodiment presents a different air path and it will be described, focused to this different feature.

In reference to FIG. 5, the air having passed the evaporator 132 is exhausted outside the dryer along a fourth air path 17. In other words, different from the circulation type which supplies the air having passed the evaporator 132 to the condenser 136, the exhaustion type dryer exhausts the air outside. In this case, the air exhausted from the drum 120 has a higher temperature than a normal temperature air. When the air exhausted from the drum 120 reaches the evaporator 132, the heat is transmitted to the refrigerant of the evaporator 132 and the latent heat is stored in the refrigerant. Such the refrigerant is supplied to the condenser 136 along the refrigerant line 22 and the air is heated by the latent heat in the condenser 136. Here, the air is drawn to the condenser 136 along a fifth air path 19. Not the air exhausted from the drum 120 but internal air or external air of the dryer is flowing along the fifth air path 19.

Figure 6:
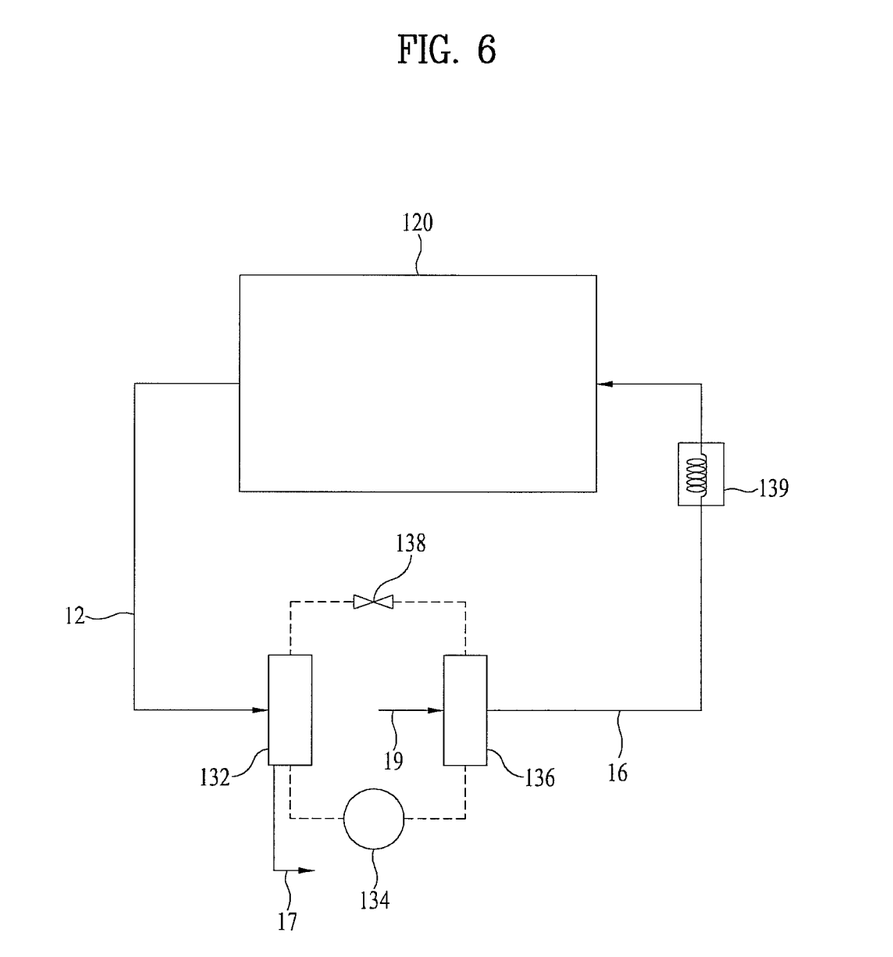

FIG. 6 illustrates an exhaustion type dryer according to another embodiment including the heat pump. Compared with the embodiment of FIG. 5, the air having passed the heat pump is re-heated by a heater 139 before supplied to the drum. The exhaustion type dryer is described in reference to FIG. 5 and the heater is described in reference to FIG. 4. Repeated description will be omitted.

In the meanwhile, the above embodiments present the heat pump including the single evaporator and the single condenser. However, the heat pump may include a plurality of evaporators 132 and a plurality of condensers 136.

Figure 7:
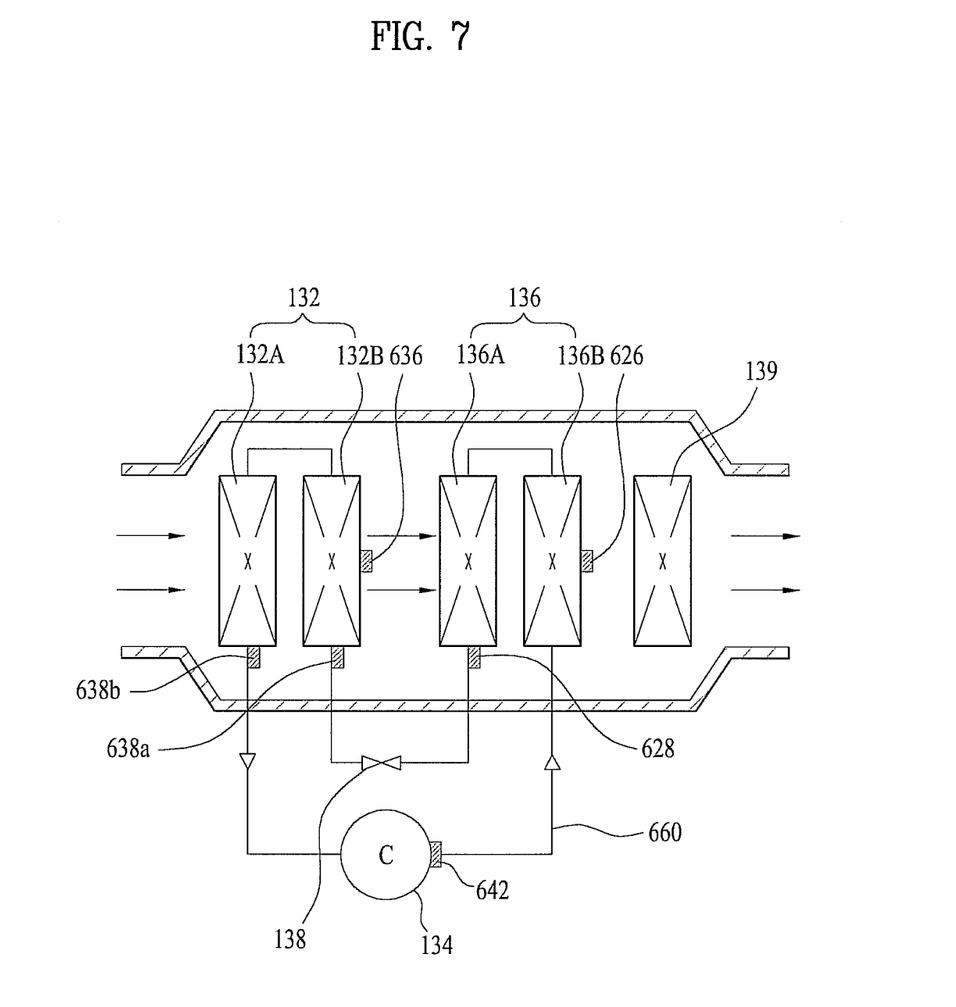
FIGS. 7 and 8 are diagram illustrating a configuration of a heat pump according to another embodiments.
Figure 8:
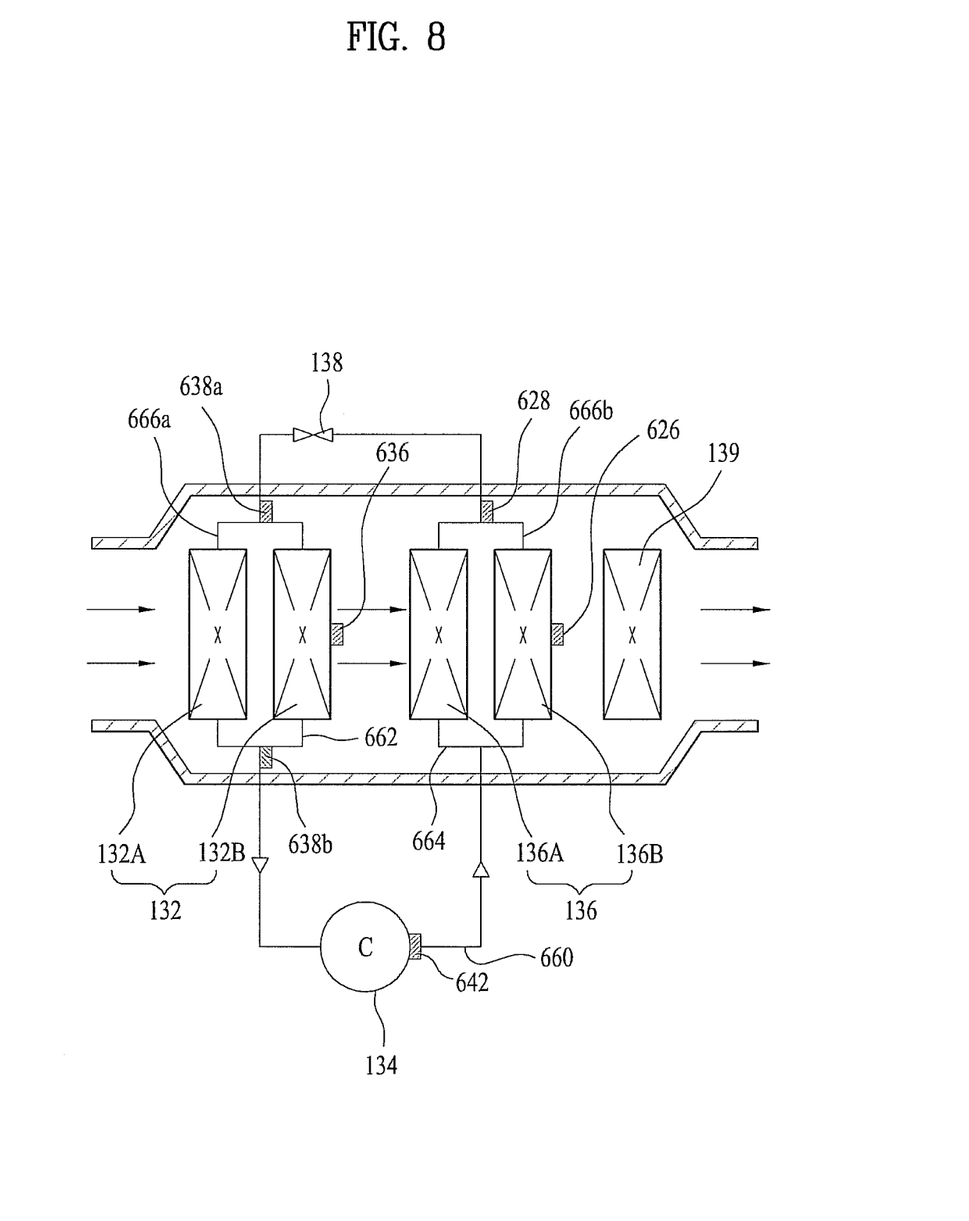

As follows, installation states of the plurality of the condensers 136 and evaporators 132 will be described. FIGS. 7 and 8 are diagrams schematically illustrating a heat pump module including a plurality of condensers 136 and a plurality of evaporators 132.

In reference to FIG. 7, the number of the evaporators 132 and the number of the condensers 136 may be determined based on an installation environment, for example, two evaporators and two condensers, which will be described as follows.

The evaporator 132 according to this embodiment includes a first evaporator 132A and a second evaporator 132B. The condenser 136 includes a first condenser 136A and a second condenser 136B. The first and second evaporators 132A and 132B may be arranged adjacent to each other. The first and second condensers 136A and 136B may be also arranged adjacent to each other. Here, the first and second evaporators and the first and second condensers may be arranged in parallel to the air path.

In the meanwhile, the first and second evaporators 132A and 132B and the first and second condensers 136A and 136B are connected with the compressor 134 by a refrigerant pipe 660. Here, the connection between the refrigerant pipe and the first and second evaporators 132A and 132B and the first and second condensers 136A and 136B may be serial or in parallel.

Here, when the first and second evaporators 132A and 132B and the first and second condensers 136A and 136B are connected with the refrigerant pipe 660 serially, the compressor 134 is connected with the first evaporator 132A via the refrigerant pipe 660 and the first evaporator 132A is connected with the second evaporator 132B via an auxiliary pipe. Because of that, the refrigerant pipe 660 is located from the second evaporator 132B to the expansion valve 138 and the refrigerant pipe is located from the expansion valve 138 to the first condenser 136A. Here, the first condenser 136A is connected with the second condenser 136B via an auxiliary pipe and the refrigerant pipe 660 is located between the second condenser 136B and the compressor 134.

As a result, the refrigerant supplied from the compressor 134 heats the air, while passing the first and second condensers 136A and 136B sequentially. The refrigerant having passed the first and second condensers 136A and 136B condenses the moisture contained in the air, while passing the expansion valve 138 and the first and second evaporators 132A and 132B sequentially.

In the meanwhile, FIG. 7 shows that the first and second evaporators 132A and 132B are connected with each other serially and that the first and second condensers 136A and 136B are connected with each other serially, too. However, the first and second evaporators 132A and 132B may be connected in parallel and the first and second condensers 136A and 136B may be connected in parallel. FIG. 8 shows the plurality of the evaporators connected with each other in parallel and the plurality of the condensers connected with each other in parallel. As follows, the different feature in comparison to FIG. 7 will be described.

In reference to FIG. 8, the first and second evaporators 132A and 132B are connected with each other in parallel and the first and second condensers 136A and 136B are connected with each other in parallel. In this case, branched pipes 662 and 664 may be further formed in the refrigerant pipe 660 located from the compressor 134 to the first and second evaporators 132A and 132B and in the refrigerant pipe 660 located from the compressor 134 to the first and second condensers 136A and 136B, respectively. In addition, branched pipes 666a and 666b may be further formed in the refrigerant pipe 660 located from the expansion valve 138 to the first and second evaporators 132A and 132B and in the refrigerant pipe 660 located from the expansion valve 138 to the first and second condensers 136A and 136B, respectively.

The branched pipe 662 is connected to an end of the refrigerant pipe 660 located between the compressor 134 and the first and second evaporators 132A and 1132B, such that the refrigerant may be supplied to the first evaporator 132A and the second evaporator 132B via the branched pipe 662 simultaneously. Together with that, the branched pipe 664 is connected to an end of the refrigerant pipe 660 located between the compressor 134 and the first and second condensers 136A and 136B, such that the refrigerant having passed the first and second condensers 136A and 136B may be supplied to the compressor 134 via the branched pipe 664.

The refrigerant supplied by the compressor 134 condenses the moisture contained in the air, while dividedly passing the first and second evaporators 132A and 132B, and it heats the air, while dividedly passing the first and second condensers 136A and 136B.

In reference to FIGS. 7 and 8 again, the moisture of the humid air exhausted from the drum 120 is condensed and removed, while the air is passing the first and second evaporators 132A and 132B sequentially. After that, the humid air is changed into dried air. The dried air exhausted from the evaporator 132 is heated while it is passing the first and second condensers 136A and 136B sequentially. After that, the high temperature dried air having passed the second condenser 136B is re-supplied to the inside of the drum 120. The embodiments of FIGS. 7 and 8 illustrate only the configuration of the circulation type dryer and they may be applicable to the exhaustion type dryer. In case of the exhaustion type, the evaporator and condenser shown in FIGS. 5 and 6 may be replaced by the plurality of the evaporators and the plurality of the condensers shown in FIGS. 7 and 8.

In the meanwhile, the dryer according to the exemplary embodiment of the present invention has an effect of improved condensation efficiency, because the humid air exhausted from the drum 120 passes the first evaporator 132A and the second evaporator 132B sequentially. In other words, the humid air passes the first and second evaporators 132A and 132B. Because of that, a contact area and a contact time between the humid air and the refrigerant line of the first and second evaporators 132A and 132B may be increased enough to condense the moisture contained in the humid air as much as possible.

In addition, the dryer according to the exemplary embodiment of the present invention has an effect of increased heating efficiency, because the air passes the first condenser 136A and the second condenser 136B sequentially. Because of that, a contact area and a contact time between the dried air and the refrigerant line of the first and second condensers 136A and 136B may be increased enough to gain a relatively high temperature dried air, compared with the dried air passing the single condenser.

As a result, such the high temperature dried-air is supplied to the inside of the drum 120 to heat-exchange with the drying objects. Then, heat-exchanging efficiency can be enhanced and the drying time can be reduced.

In the meanwhile, the compressor of the heat pump may include a fixed velocity type compressor of which a driving velocity is fixed and a inverter compressor of which a driving velocity is adjusted. Here, the inverter compressor may refer to a compressor having a selectively adjustable driving velocity (hz), not a fixed driving velocity. As the driving velocity of the compressor 134 is adjusted, noise and vibration of the compressor 134 may be reduced and damage and breakdown of the compressor may be prevented.

However, important elements for adjusting the driving velocity of the inverter compressor 134 may be temperature information of the refrigerant. The temperature information of the refrigerant may include at least one of a refrigerant condensation temperature of the condenser 136, a refrigerant evaporation temperature of the evaporator 132, an exhausted refrigerant temperature of the condenser 136 and drawn/exhausted refrigerant temperature of the evaporator 132. In other words, the control unit (not shown) of the dryer 100 may control a driving velocity of the compressor 134 based on the temperature information on the refrigerant.

As follows, a configuration for sensing the temperature of the heat pump will be described in detail.

As shown in FIGS. 7 and 8, the heat pump may includes the evaporator 132, the compressor 134, the condenser 136 and the expansion valve 138 which are connected with each other via the refrigerant pipe 660. The dryer according to this embodiment may include at least one temperature sensor to sense the above temperature information. When sensing the exhausted refrigerant temperature of the condenser 136 and the drawn/exhausted refrigerant temperature of the evaporator 132, temperature sensors 628, 639a and 638b may be provided at a refrigerant outlet hole of the condenser 136 and refrigerant inlet and outlet holes of the evaporator 132, respectively. In addition, when sensing an exhaustion temperature of the compressor 134, a temperature 642 may be further provided on an outlet hole of the compressor 134.

In other words, when sensing the exhausted refrigerant temperature of the condenser 136 and the drawn/exhausted refrigerant temperature of the evaporator 132, the locations of the temperature sensors 628, 638a, 638b and 642 may affect the temperature sensing. However, when sensing the refrigerant condensation temperature of the condenser 136 and the refrigerant evaporation temperature of the evaporator 132, the locations of the temperature sensors 628, 638a and 638b may be important. That is, to sense a phase change temperature of the refrigerant in the condenser 136 and the evaporator 132, it is preferable that temperature sensors 626 and 636 are provided along a line of the refrigerant line where the phase change is generated inside the condenser 136 and the evaporator 132.

In the meanwhile, the evaporator 132 may include a first temperature sensor 636 to sense the phase change temperature, that is, the evaporation temperature of the refrigerant in the evaporator 132 and the evaporator. The first temperature sensor 636 may be provided at a predetermined portion of the evaporator 132 to sense the phase change temperature of the refrigerant in the evaporator 132. For example, the first temperature sensor 636 may be provided at an almost center of the refrigerant line provide along an inside of the evaporator 132, that is, near a center of the length of the refrigerant line. This is because the phase change could be generated near the center portion of the length of the refrigerant line inside the evaporator 132. When the phase change of the refrigerant is generated near a refrigerant inlet hole or a refrigerant outlet hole along the refrigerant line of the evaporator 132, the refrigerant fails to heat-exchange with the air sufficiently and entire efficiency of the heat pump might be deteriorated. As a result, the phase change of the refrigerant may be generated at the center portion along the length of the refrigerant line of the evaporator 132 and the first temperature sensor 636 may be provided adjacent to the center along the length of the refrigerant line of the evaporator 132, to sense the phase change temperature of the refrigerant.

In addition, the condenser 136 may include a second temperature sensor 626 to sense a phase change temperature of the refrigerant therein. The second temperature sensor 626 may be located at a predetermined portion in the condenser 136 to sense the phase change temperature of the refrigerant in the condenser 136. For example, the second temperature sensor 626 may be provided adjacent to a center of the refrigerant line provided along the inside of the condenser 136, that is, adjacent to a center along the length of the refrigerant line. This is because the phase change can be generated near the center along the length of the refrigerant line of the condenser 136. In addition, when the phase change of the refrigerant is generated near a refrigerant inlet hole or a refrigerant outlet hole along the refrigerant line of the condenser 136, the refrigerant fails to heat-exchange with the air sufficiently and entire efficiency of the heat pump might be deteriorated. As a result, the phase change of the refrigerant may be generated at the center portion along the length of the refrigerant line of the condenser 132 and the second temperature sensor 626 may be provided adjacent to the center along the length of the refrigerant line of the condenser 136, to sense the phase change temperature of the refrigerant.

Here, when the evaporator 132 and the condenser 136 are conventional ones, a predetermined length refrigerant line and a plurality of heat-exchanger fins (not shown) connected with the refrigerant line to increase heat exchanging efficiency may be provided. In this case, a center area of the refrigerant line happens to be overlapped with the heat exchanger fins and it is difficult to install and secure the first and second temperature sensors 626 and 636 disadvantageously.

Because of that, it is preferable that the first and second temperature sensors 626 and 636 are installed on the refrigerant, with not overlapped with the heat exchanger fins. In other words, the first and second temperature sensors 626 and 636 may be installed at the heat exchanger fins composing the evaporator 132 and the condenser 136 and at the refrigerant line passing the heat changer fins, with exposed to a predetermined portion of the heat exchanger fins. Even in this case, the installation locations of the first and second temperature sensors 626 and 636 may be adjacent to the center area of the refrigerant line.

In the meanwhile, the conventional heat pump typically uses an on/off type compressor which is a fixed velocity type compressor. The fixed velocity type compressor has an operational characteristic of on/off based on power supply. In other words, the conventional fixed velocity type compressor is always operated at a predetermined RPM. However, the compressor may not use all of the electric power supplied in an initial driving time and a relatively large quantity of the power is discharged as heat. Because of that, in case of the fixed velocity type compressor driven at the predetermined RPM, compression efficiency of the refrigerant might be deteriorated drastically for a predetermined time period when the power supplied in the initial driving time is discharged as heat and normal compression efficiency returns gradually a predetermined time. As a result, the heat cannot be supplied to the air normally in the initial driving period of the heat pump and the air cannot be heated enough. Because of that, the drying efficiency might be deteriorated.

Especially, such the problem could be generated in 'Quick driving course' which has a relatively short driving time, compared with the entire driving time of a normal course (or a standard course) of the dryer. That is, the heat is normally supplied even from the initial driving in a quick driving course and the air is changed into the heated dried air. However, if the drying efficiency is deteriorated in the initial driving of the heat pump, it is difficult to complete the drying in a short time and the driving time is getting long. Because of that, the quick driving course cannot be embodied. As follows, a control method of the dryer will be described to solve the above problem.

Figure 9:
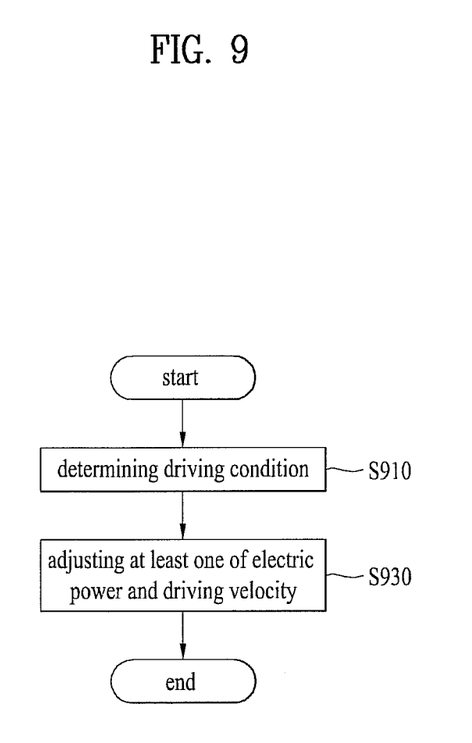
FIG. 9 is a flow chart illustrating a control method of the above dryer according to an embodiment.

FIG. 9 is a flow chart illustrating a control method of the dryer according to an embodiment. The control method which will be described is a method of controlling the heat pump in an initial driving period of the heat pump provided in the dryer.

In reference to FIG. 9, the control method of the dryer may include determining a driving condition of the dryer (S910), and adjusting at least one of the electric power supplied to the inverter compressor based on the driving condition and a driving velocity of the compressor (S939).

First of all, when the user selects one of the courses provided in the dryer, the control unit provided in the dryer may determine the driving condition of the dryer (S910). In other words, when the user selects a course or while the selected course is driven, the control unit may identify the driving condition. Here, 'ional condition' refers to a driving condition having a relatively short driving time than the standard course (or the normal state) when the dryer is driven. The driving condition may be set by the user or automatically set by the control unit, and it will be described as follows.

Here, the driving condition of the dryer may be corresponding to the driving condition of the heat pump, specifically, the driving condition of the compressor. Such the driving condition may be input by the user passively or by the control unit automatically. For example, the user selects so-called 'Quick driving course' to reduce the driving time of the dryer and he/she may input a driving condition manually. Alternatively, the control unit may input a driving condition automatically based on at least one of the quantity of the drying objects and the peripheral temperature of the dryer.

If the user tries to input the driving condition manually, an auxiliary quick course may be provided in the dryer or so-called 'quick time function' may be selected by auxiliary selection after course selection. Because of that, the user may select a predetermined course such as a quick course or select a predetermined mode such as 'quick time function', and then a driving condition ma be input.

In the meanwhile, if the driving condition is input by the control unit automatically, the control unit may input the driving condition based on the quantity of the drying objects loaded into the dryer and the peripheral temperature of the dryer.

For example, when the quantity of the drying objects inside the dryer is a preset value or less, the control unit may automatically set a driving condition and it may apply the driving condition. In other words, if the quantity of the drying objects is relatively small, a quick driving time or mode may be selected by the control unit automatically.

However, even when drying a small quantity of drying objects, the user tries to dry the drying objects in a standard course or another course. For this case, if the quantity of the drying objects is a predetermined value or less, the control unit may rush the user whether to apply the quick driving course. In other words, when the quantity of the drying objects is a predetermined value or less, the control unit rushes the user whether to apply the quick driving course or quick driving time mode and it drives the dryer based on the user's selected course.

In addition, when the peripheral temperature of the dryer is a predetermined value or more, the control unit may set a driving condition automatically. As mentioned above, the dryer according to the present invention uses the heat pump to heat and supply the air, in case of supplying heated-air to the drum. However, the heat pump can remove the moisture contained in the air and heat the dried air more efficiently, as the temperature of the air drawn into the evaporator is getting higher. This is because the quantity of the latent heat transmitted to the refrigerant of the evaporator is getting larger as the temperature of the air drawn into the evaporator is getting higher. Especially, in case of the exhaustion type dryer out of the circulation type and the exhaustion type, drying efficiency may be enhanced. However, even in case of the circulation type, the temperature of the air flowing along a circulation path is increased as the peripheral temperature of the dryer is increased. Because of that, the driving efficiency may be increased. If the peripheral temperature of the dryer is a predetermined value or more, for example, approximately 25 to 35° C. or higher, the temperature of the air drawn into the evaporator may be heightened and the drying efficiency achieved by the heat pump may be increased accordingly. As a result, in this case, the drying efficiency would not be deteriorated relatively much even in the initial driving of the heat pump and it is then possible to reduce the driving time of the heat pump. Eventually, the control unit sets the driving condition automatically, when the peripheral temperature of the dryer is a predetermined value or more.

Similar to the above description, when the peripheral temperature of the dryer is a predetermined value or more, the control unit rushes the user whether to apply the quick driving course or the quick driving time mode and the control unit drives the dryer based on the course selected by the user.

As follows, the step of adjusting at least one of the electric power supplied to the inverter compressor and the driving velocity of the compressor (S930) will be described.

Figure 10:
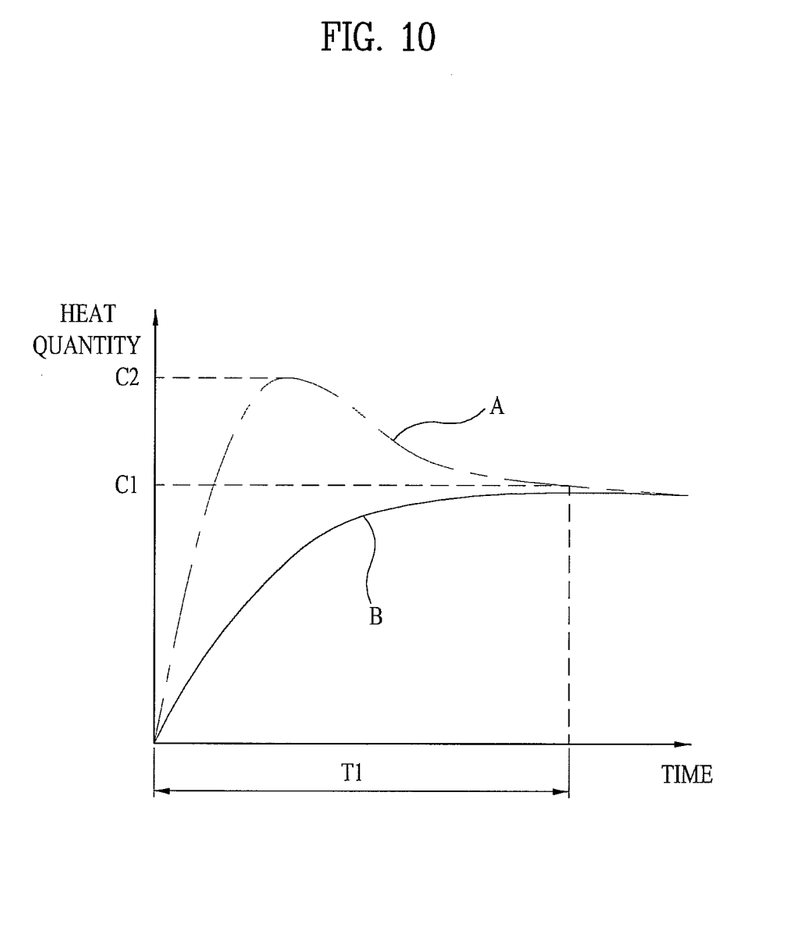
FIG. 10 is a graph illustrating relationship between the time and the quantity of heat in an initial driving of the heat pump.

FIG. 10 is a graph of a relation between the time and the heat in the initial driving period of the heat pump. A horizontal axis of the graph refers to flow of the time and a vertical axis refers to the quantity of the heat supplied by the heat pump. 'A' curvature refers to an interrelation between the time and the heat in case of using the inverter compressor and 'B' curvature refers to an interrelation between the time and the heat in case of using the fixed velocity type compressor.

In reference to FIG. 10, as mentioned above, in case of using the fixed velocity type compressor, the quantity of the heat supplied by the heat pump is getting increased slowly for a first time period (T1) after the heat pump is driven. Here, the first time period is corresponding to approximately 20~25% of the time, compared with the driving time set in the dryer. In other words, if the quantity of the heat supplied by the heat pump in the normal state refers to 'C1', quite a lot of time is required for the quantity of the heat to reach 'C1'. Also, the quantity of the heat supplied for the first time period is relatively smaller than the target quantity of the heat (C1). Because of that, even when the heat pump is driven, the air cannot be condensed and heated enough during the first time period and the drying efficiency might be deteriorated.

As a result, to solve the problem, the control method according to this embodiment adjusts at least one of the electric power supplied to the inverter compressor and the driving velocity of the compressor, for the first time period. Specifically, at least one of the electric power and the driving velocity of the compressor may be relatively increased much for the first time period, to be largely increased in comparison to a case of driving the compressor in the normal state. Because of that, 'B' curvature may be differentiated, according to the quantity of the heat in the initial driving period in case of using the inverter compressor. That is, compared with the case of using the fixed velocity type compressor, a relatively large quantity of heat may be supplied by the heat pump in the initial driving period. Because of that, compared with the fixed velocity type compressor, the inverter compressor may supply a more quantity of heat in the initial driving period and the driving time of the dryer may be reduced.

Here, in this case, over-shoot might be generated in the heat quantity curvature. If the over-shoot is too large, heat waste might be generated. because of that, the control method according to this embodiment controls a maximum value of the heat quantity supplied by the over-shoot is 1.5 times or less as much as the quantity of the heat in the normal state.

The dryer is applied to the above embodiments to explain the present invention and the control method according to the embodiments may be applicable to a washing machine having a drying function as well as the dryer. By extension, the control method may be applicable to a laundry treatment apparatus including the heat pump to dry clothes.

The control method According to the present invention adapts the inverter compressor as compressor provided in the heat pump. Because of that, the operational efficiency of the heat pump in an initial period of the heated air supply may be enhanced effectively.

Furthermore, the control method according to the present invention may vary the electric power supplied to the inverter compressor based on the load of the dryer, to vary the supply quantity and the supply temperature of the heated air. Because of that, operational efficiency of the dryer may be enhanced effectively.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a dryer comprising a heat pump including an inverter compressor, the method comprising:
   determining an entire driving time of the dryer; and
   adjusting, when the entire driving time is relatively shorter than the entire driving time in a normal state, at least one of an electric power supplied to the inverter compressor or a driving velocity of the compressor based on the entire driving time which is relatively shorter than the entire driving time in the normal state, wherein the at least one of the electric power or the driving velocity of the compressor is set to be relatively larger or higher, compared with an electric power and a driving velocity of the compressor driving in the normal state.

2. The method as claimed in claim 1, wherein the entire driving time of the dryer is set manually or automatically.

3. The method as claimed in claim 1, wherein the entire driving time of the dryer is set based on at least one of a user's input, a quantity of drying objects loaded in the dryer, and a peripheral temperature of the dryer.

4. The method as claimed in claim 3, wherein the entire driving time of the dryer is set by a user's selection of a predetermined course or a predetermined mode.

5. The method as claimed in claim 3, wherein the entire driving time of the dryer is set by a controller when the quantity of the drying objects loaded in the dryer is a predetermined value or less.

6. The method as claimed in claim 3, wherein the entire driving time of the dryer is set by a controller when the peripheral temperature of the dryer is a predetermined value or more.

7. The method as claimed in claim 1, wherein the adjusting of the at least one of the electric power supplied to the inverter compressor or the driving velocity of the compressor is performed for a first time period after the dryer starts.

8. The method as claimed in claim 7, wherein the first time period corresponds to 20%~25% of a driving time set in the dryer.

9. The method as claimed in claim 1, wherein a maximum value of a quantity of heat supplied by the heat pump is 1.5 times or less as much as the quantity of heat supplied by the heat pump in a normal state.

10. A method of controlling a dryer comprising a heat pump including an inverter compressor, the method comprising:
    determining a driving condition of the dryer; and
    adjusting at least one of an electric power supplied to the inverter compressor or a driving velocity of the inverter compressor based on the driving condition, wherein the adjusting of the at least one of the electric power supplied to the inverter compressor or the driving velocity of the inverter compressor is performed for a first time period after the dryer starts, and wherein the at least one of the electric power or the driving velocity of the compressor is set to be relatively larger or higher, compared with an electric power and a driving velocity of the inverter compressor in a normal state.

11. The method as claimed in claim 10, wherein the driving condition of the dryer comprises an entire driving time which is relatively shorter than an entire driving time of a driving condition in the normal state.

12. The method as claimed in claim 10, wherein the first time period corresponds to 20%~25% of a driving time set in the dryer.

* * * * *